United States Patent [19]

Watson

[11] Patent Number: 5,655,132
[45] Date of Patent: Aug. 5, 1997

[54] REGISTER FILE WITH MULTI-TASKING SUPPORT

[75] Inventor: George A. Watson, Fullerton, Calif.

[73] Assignee: Rockwell International Corporation, Newport Beach, Calif.

[21] Appl. No.: 287,017

[22] Filed: Aug. 8, 1994

[51] Int. Cl.⁶ .................................................. G06F 9/42
[52] U.S. Cl. ...................... 395/674; 395/421.1; 395/676
[58] Field of Search ............................... 395/375, 775, 395/800, 410, 412, 421.04, 421.1

[56] References Cited

U.S. PATENT DOCUMENTS

| | | | |
|---|---|---|---|
| 4,031,514 | 6/1977 | Kihara | 395/421.1 |
| 4,272,828 | 6/1981 | Negi et al. | 364/736 |
| 4,777,588 | 10/1988 | Case et al. | 395/800 |
| 4,805,097 | 2/1989 | De Sanna | 364/200 |
| 4,809,156 | 2/1989 | Taber | 395/421.07 |
| 4,853,848 | 8/1989 | Bain, Jr. et al. | 395/412 |
| 4,959,778 | 9/1990 | Miyadera et al. | 395/421.04 X |
| 4,969,091 | 11/1990 | Muller | 395/775 |
| 4,980,819 | 12/1990 | Cushing et al. | 395/550 X |
| 4,992,934 | 2/1991 | Portanova et al. | 395/375 |
| 5,293,637 | 3/1994 | Childers et al. | 395/800 |
| 5,333,288 | 7/1994 | Kusuda | 395/421.04 |
| 5,357,617 | 10/1994 | Davis et al. | 395/375 |
| 5,367,705 | 11/1994 | Sites et al. | 395/800 |

OTHER PUBLICATIONS

Hyperstone Electronics–Hyperstone 32–Bit–Microprocessor User's Manuel; pp. 1–18 Thru 1–20; 3–34; Dated 1987.
Advanced Micro Devices–AM29000 User's Manual pp. 4–12 Thru 4–15; 7–1 Thru 7–19; Dated 1989.

Fujitsu Product Description: SPARC TM MB86901 (S–25) High Performance 32–Bit RISC Processor; pp. 12–16; Dated Jun. 1989.

*Primary Examiner*—Glenn A. Auve
*Attorney, Agent, or Firm*—William C. Cray; Philip K. Yu

[57] ABSTRACT

A register file connected to a data memory and an arithmetic logic unit for temporary storage of operands, and a method of managing such register file permits the register file to be used to maximum efficiency, and permits rapid task and context switching. Each register of the register file has an absolute address. A relative register address is read from the address field of the instruction being executed by the ALU, and an arithmetic calculation is performed on that relative register address and a register base address to obtain an absolute register address of the register to be accessed. Different sets of registers may be designated for different tasks or contexts. Each set of registers has its own base address. Once the task or context to which the instruction applies is determined, a calculation using the relative address from the instruction address field, and the corresponding register set base address may be performed to obtain the absolute address of the register to be accessed. Registers assigned to a different task or context may be virtually immediately accessed, or a set of registers for a particular task or context may be moved within the register file without affecting the instructions being executed by the ALU, by simply changing the base address used in the address computation.

7 Claims, 8 Drawing Sheets

FIG. 10

REGISTER FILE WITH MULTI-TASKING SUPPORT

BACKGROUND OF THE INVENTION

The present invention relates to the structure and operation of rapid-access memory for an arithmetic logic unit (ALU) for a general purpose or special purpose computer. In particular, the invention relates to the control of a register file that provides temporary storage of operands for access by instructions being executed by the ALU within a particular task or context. The invention is particularly, though not exclusively, suited for use in a special purpose digital signal processor having a Reduced Instruction Set Computer (RISC) architecture.

Each time the ALU executes an instruction, it must generally access an operand stored in memory. In addition, the results of many computations are stored, either temporarily or permanently, in memory. Virtually every arithmetic computation performed by the arithmetic logic unit of the computer requires accessing memory. Therefore, the speed at which such memory is accessed is important to the overall speed of operation of the computer.

Register files have been used to permit rapid access to operands required, and to provide temporary storage of data during computations. These register files comprise fast access memory in which data from a portion of the computer's main memory may be stored while a particular task or subroutine is carried out.

Access to a register file is faster than access to main memory partially because the register file has fewer storage locations than the main memory unit. Thus, the addressing mechanism reads and decodes a much shorter address than would be required to address the main memory unit.

Upon beginning a particular task or subroutine, data associated with that particular subroutine is loaded from the main memory into the register file. Then, when the computer is finished with the subroutine, the data, including data that was changed or added during execution of the task or subroutine, is transferred from the register file back to the main memory. The register file may now be filled with data associated with the next subroutine required by or being executed by the arithmetic logic unit.

This need to transfer data back and forth between the register file and the main memory each time a different subroutine is referenced slows the process of switching between tasks or subroutines. Therefore, some have suggested using a register file divided into two sections so that data associated with two subroutines may be simultaneously stored within the register file. As generally suggested, each section of the divided register file has a fixed size.

In a computer of conventional architecture, the transfer of data between the main memory and the register file may be controlled by a memory management unit or other memory control device.

Reduced Instruction Set Computer (RISC) architecture has become prominent as a mechanism to streamline the execution of instructions by a computer processor. In such an environment, the speed of access to the memory may be more critical than in computers having a standard architecture.

A RISC architecture device uses special load and store instructions to move data between the register file and the main memory. In addition, a special register to register transfer instruction is used to move operands between registers of the register file.

Figure 1A:
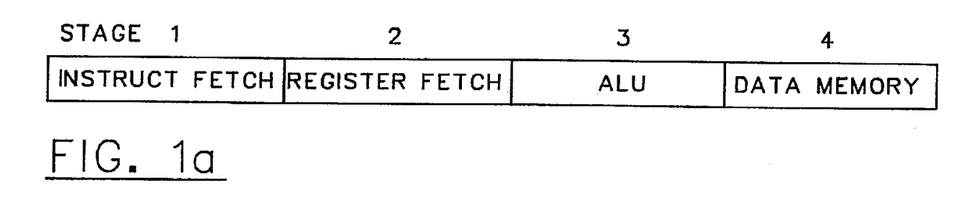
FIGS. 1a and 1b are timing diagrams for an execution pipe of a processor having a RISC architecture.

A RISC controller or processor may generally execute instructions in accordance with the execution pipe illustrated in FIG. 1a. The four stages of the RISC execution pipe are instruction fetch, operand fetch from registers, execution in the arithmetic logic unit (ALU), and data memory access (read or write).

The first stage of the execution pipe is instruction fetch. The required operands are fetched from registers during the second stage. Adder, shifter, and other operations are executed during stage 3. Data memory access normally occurs during stage 4 and beyond, if necessary to complete the access. The RISC instruction execution pipe may also contain five stages, allowing for greater time for ALU operations and memory access. Other operations may be executed at stages 3 and beyond, depending on the instruction being executed.

Figures 1B, 2:
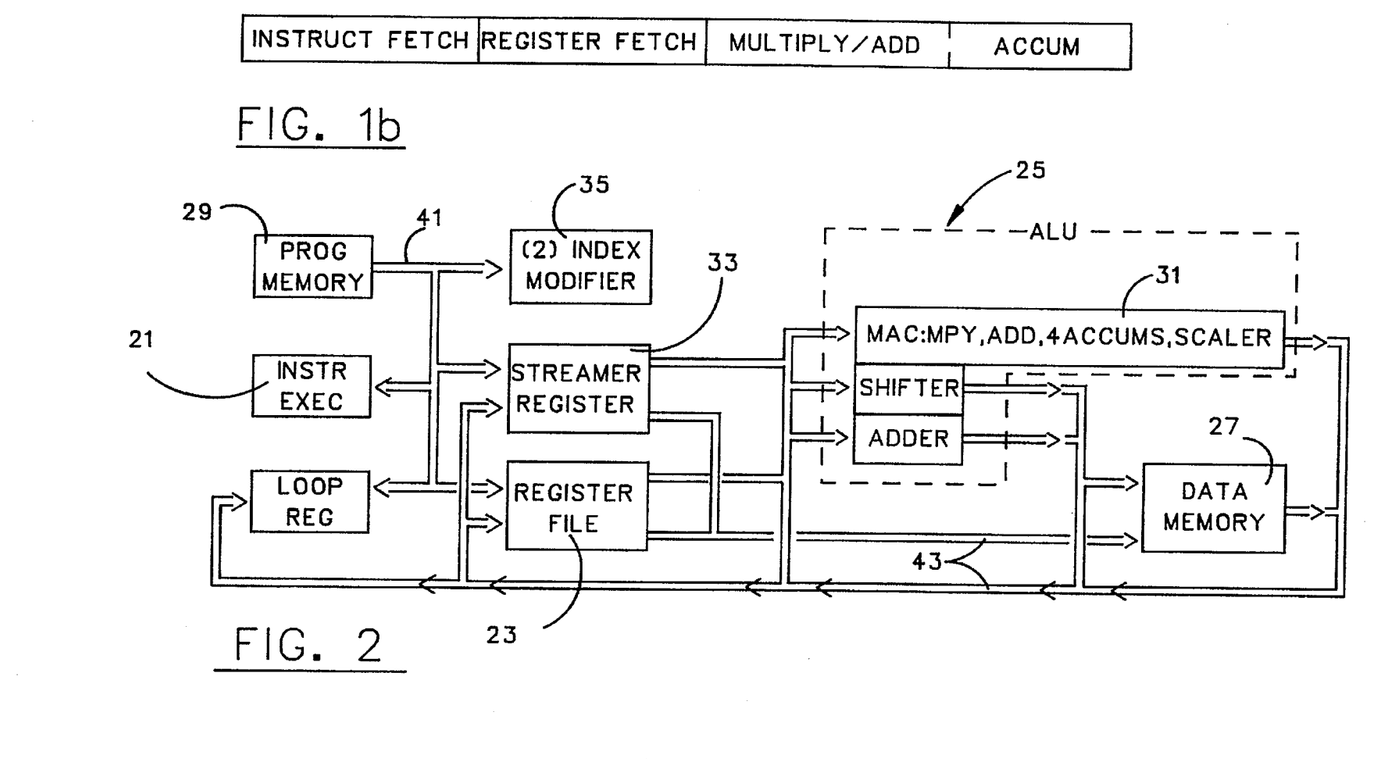
FIG. 2 is a block diagram of an embodiment of a signal processor designed in accordance with a RISC architecture, and in which the invention may be used.

An alternative instruction pipe for multiply operations is illustrated in FIG. 1b. The multiply and add operation may extend from stage 3 into the first part of stage 4, with the accumulate function occurring during the latter part of stage 4.

Generally, an instruction is launched each clock time, and progresses through the RISC execution pipe at the rate of one stage per instruction cycle. If an operand is not available at the required time, a hardware interlock may hold up execution of the instruction requiring that operand. The hardware interlock may also hold up instruction execution if a preceding instruction is not sufficiently complete.

SUMMARY OF THE INVENTION

The present invention is a register file and the method of managing such a register file.

In a computer having a memory and an arithmetic logic unit (ALU) for performing arithmetic operations on operands in accordance with program instructions, a register file in accordance with the invention includes a plurality of registers coupled to the memory and to the ALU for temporarily storing operands for use by the ALU. Each register has a unique absolute address.

The register file additionally includes a mechanism for designating a first set of registers beginning with a first base address, and a second set of registers beginning with a second base address. The first set of registers includes a first set of global registers commencing with a first global base address, and a first set of local registers commencing with a first local base address. The second set of registers includes a second set of global registers commencing with a second global base address, and a second set of local registers commencing with a second local base address.

The register file further contains an addressing mechanism. The addressing mechanism includes the capability of reading from an instruction a relative address, determining whether that relative address identifies a register of the first register set or a register of the second register set, and calculating from the relative address the absolute address of the register to be addressed. If the register to be addressed is in the first set of global registers, the calculation additionally uses the first global base address, and if the register to be addressed is in the first set of local registers, the calculation additionally uses the first local base address. If the register to be addressed is in the second set of global registers, the calculation uses the second global base address, and if the register to be addressed is in the second set of local registers, the calculation uses the second local base address.

In accordance with one aspect of the invention, the designating means can designate, at a different time, a different plurality of the registers in the register file as the first set of registers, the different plurality of registers having absolute addresses beginning with a third base address. The addressing means then calculates from the relative address and the third base address the absolute address of the register to be addressed.

The method of managing the register file in accordance with the invention includes designating a first set of registers comprising registers having absolute addresses commencing with a first base address, and designating a second set of registers comprising registers having absolute addresses commencing with a second base address. Addressing a register of the register file includes reading from an address field in an instruction a relative address, and determining whether that relative address identifies a register of the first register set or of the second register set. If the relative address identifies a register of the first set, the address of the register to be accessed is calculated from the relative address and the first base address. If the relative address identifies a register of the second set, the address of the register to be accessed is calculated from the relative address and the second base address.

The register file management device and method of the invention permits efficient use of the registers in a register file.

The present invention permits multiple register sets, each of arbitrary size and location within the register file, to be designated for different tasks and contexts.

The present invention allows the size of each designated register set to be readily changed.

The present invention permits registers to be readily reassigned within a task or to different tasks.

The present invention permits reassignment of the registers associated with a particular task for maximum usage of the registers of the register file.

The register file management device and method of the invention additionally permits more than one task to have instantaneous access to registers in the register file, to support instantaneous context switching on calls, traps, exceptions, and returns.

The invention further permits a system memory stack that can be switched to a new stack location in the register file to support very fast switching for multi-tasking.

The device and method of the invention further permits automatic and incremental saving and restoring of data to data memory, to efficiently support register file overflow.

DETAILED DESCRIPTION OF THE PREFERRED EMBODIMENTS

In a preferred embodiment, the register file of the present invention is particularly useful in a controller or a signal processor designed using a reduced instruction set computer (RISC). Therefore, such an environment will be briefly described.

A block diagram of the core portion of a RISC architecture device such as may incorporate the register file of the invention is shown in FIG. 2. The illustrated device may implement a controller or a digital signal processor. The device includes an instruction execution unit 21, a register file 23, an arithmetic logic unit (ALU) 25, data memory 27, and program memory 29.

The ALU 25 includes a multiply/accumulate unit (MAC) 31, comprising a multiplier, an adder, four accumulators, and a scaler.

Instructions are stored in the program memory 29. Such instructions are generally capable of specifying two source operands and a destination operand. Each instruction may be 32 bits in length. The instruction execution unit 21 decodes the instructions read from the program memory and controls the various operations as the instructions progress through the execution pipe.

Operands are stored in registers and in data memory. Register operands are most readily obtained from register space, which includes the register file 23, streamer data registers 33, and accumulators. Additional registers in expanded register space may be included. These registers may be accessed by only a limited set of instructions. Register space and expanded register space form the full register space. The register file 23 primarily accommodates scalar operands and provides for both global and local environments. Streamer registers 33 provide access to array operands in memory as though they were registers in register space. The accumulator registers provide storage for the results of the MAC unit 31 of the ALU 25. Other miscellaneous registers may include internal and selected input/output registers that require convenient access.

Arithmetic, logic, and shift instructions are executed in the ALU 25. Operands are taken from the register space and results are returned to the register space. Operands can be transferred within the full register space using move instructions. The results of multiply instructions are destined to accumulator registers. These accumulator registers have extended length for holding a full product and guard bits to accommodate the overflows of numerous accumulations.

Operands may be shuttled between the register space and data memory 27 by load and store instructions, or automatic memory accessing hardware referred to as streamers. The memory addresses for load and store instructions come from the register file 23 (some from full register space) and can be modified as part of the load or store instruction execution. Memory addresses for the streamers are provided by streamer index registers, which are modified in the index modifier units 35.

Although the details of the preferred embodiments will be described in connection with the register file 23, those skilled in the art will recognize that the invention may also be applied to the streamer registers 33, the accumulators, and other register environments to provide instantaneous task and context switching within those registers.

Information may be stored in the data memory 27 in, for example, 32-bit words. In the register space, operands may also be stored as 32-bit words. If necessary, operands are extended or truncated when loaded from or to memory according to the data type conversions specified in load/store instructions or streamer context registers. Of course, other length data words may also be used.

Conditional branches (PC relative address), jumps (absolute address), calls, traps, and returns are conditionally executed after a delay cycle in which a "delay slot" instruction can be selectively executed according to options provided by the instructions.

The RISC signal processor device illustrated in FIG. 2 has separate spaces for information storage: memory space and register space. The device includes separate program memory and data memory buses 41, 43 (sometimes referred to as Harvard architecture). However, the program memory and the data memory address spaces can be considered separate or co-mingled for specific device implementations. Maintaining separate buses inside the device permits simultaneous access of memory blocks. However, both buses can be used to address the same address space, and same information is accessible from any bus.

A program memory bus 41 and data memory and additional auxiliary memory buses 43 may be included. The program memory bus originates in the instruction execution unit, and is used for instructions and branch tables. The data memory bus is used by load and store instructions or streamers for transferring data between the registers and the data memory.

Register File

The register file 23 provides register space storage for operands for more rapid access by the ALU. Each register of the register file may have the same size as the size of the data words stored in data memory so that each register can store a data word. Each register of the register file has a unique absolute address. Virtually any number of registers may be included in the register file. Different embodiments may, for example, accommodate from 32 or fewer to over 2000 registers in the register file.

Figure 3:
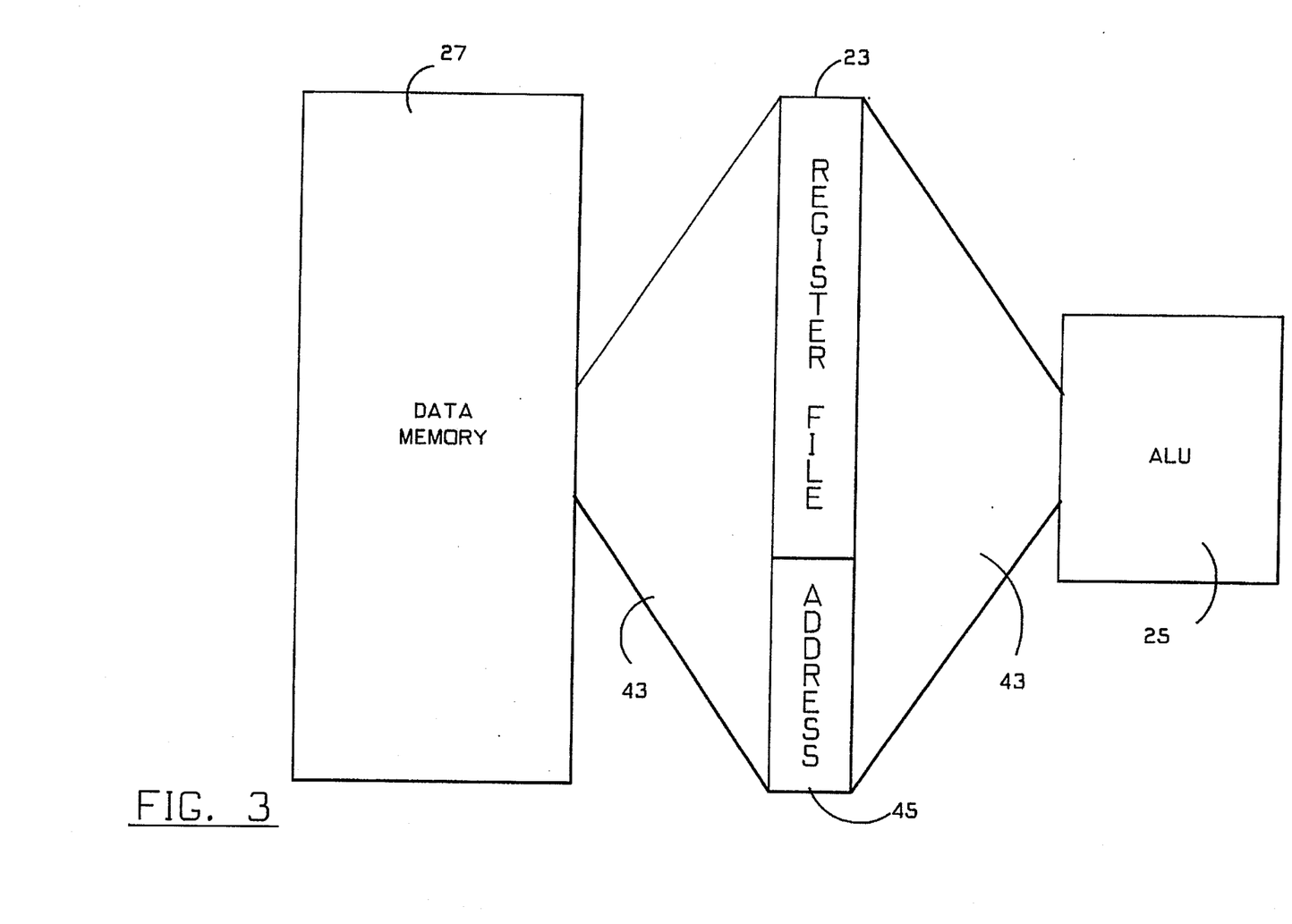
FIG. 3 conceptually illustrates a register file in accordance with the invention connected to a memory and an arithmetic logic unit.

Referring to FIG. 3, a register file 23 constructed in accordance with the invention is connected via data buses 43 to the arithmetic logic unit (ALU) 25 and the main data memory 27. Data may be read from the main data memory unit 27 and stored in the registers of the register file for rapid access by the ALU. In addition, the results of operations performed by the ALU may be temporarily stored in the register file for future use by the ALU without the need to transfer them into the main data memory. Finally, data stored in the register file, including data added or altered by the operations of the ALU, may be returned to the main memory unit when the rapid access from the register file is no longer needed, or when the space in the register file is needed for other operations.

In accordance with the present invention, a register file addressing mechanism 45 calculates the absolute address of a desired register within the register file from a base address and a relative address read from an address field of the instruction being executed by the ALU 25. The addressing mechanism 45 designates particular registers for each task or context within a task. Each such set of registers comprises the registers having addresses beginning with a particular base address. When an instruction within or pertaining to that task or context is being executed by the ALU, and a relative address is read from the address field of the instruction, the register file addressing mechanism computes from the relative address and the register file base address for the registers associated with that task or context, the absolute address of the desired register. That register may then be accessed.

Figure 4:
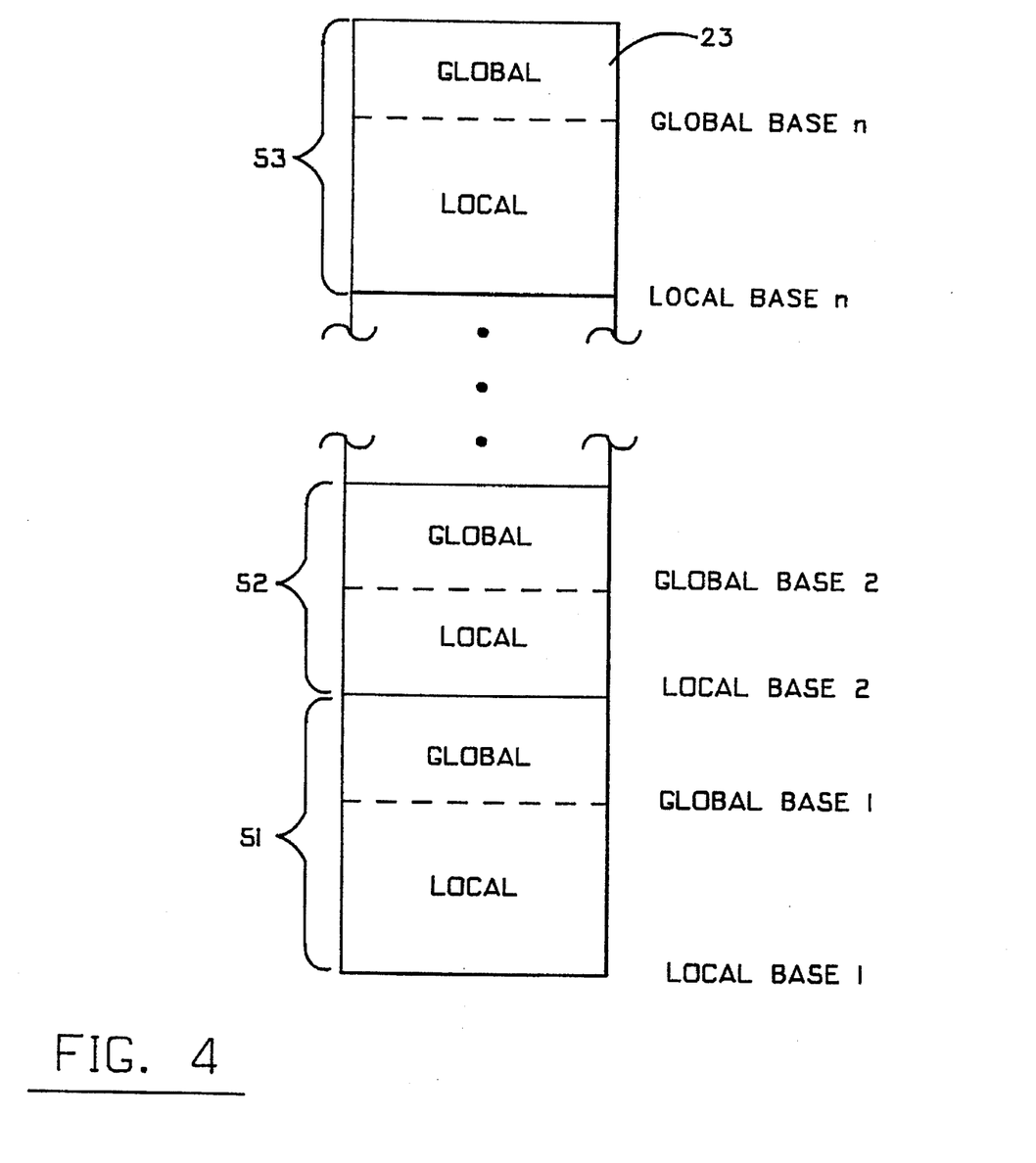
FIG. 4 illustrates a register file set up for a multiple task environment in accordance with the invention.

Referring now to FIG. 4, an exemplary register file 23 set up for an arbitrary number of tasks is illustrated. Although in the present description separate tasks are considered separate routines being executed by a single ALU, such separate tasks could be separate routines being executed by different ALUs operating simultaneously.

As shown in FIG. 4, a first set of registers 51 is provided or designated for a first task environment. This set of registers may be those registers having absolute addresses between a first base address (i.e., local base 1) and a first maximum address (i.e., local base 2). A second set of registers 52, having absolute addresses beginning with a second base address (local base 2), is provided for a second task environment, and so forth, through the nth set of registers 53 for the nth task environment. The nth set of registers may have addresses beginning with an nth base address (local base n).

As will become apparent from further description of the register file constructed and operated in accordance with the invention, the number of task environments that may be supported within the register file is essentially arbitrary, and may even change at different times during the operation of the device, depending on the needs of the program. It will also become apparent that the number of registers in each set is also essentially arbitrary, and may be different for each set. Furthermore, the number of registers assigned to a set may change over time. The register sets need not necessarily be immediately adjacent to one another.

Within each task environment of the register file, separate register groupings may be provided for global operands and local operands. A global operand is an operand that may be accessed from several contexts within the task. A local operand is an operand that is applicable only to a specific context within the task. The register groupings for local operands provide facilities for nearly instantaneous context switching for calls, exceptions, traps, and returns. In FIG. 4, the global registers for each task are those having addresses beginning with the corresponding global base address (i.e., "global base 1" for task 1, "global base 2" for task 2, etc.). The local registers for each task are those registers having absolute addresses beginning with the corresponding local base address (i.e., "local base 1," "local base 2," etc.).

Figure 5:
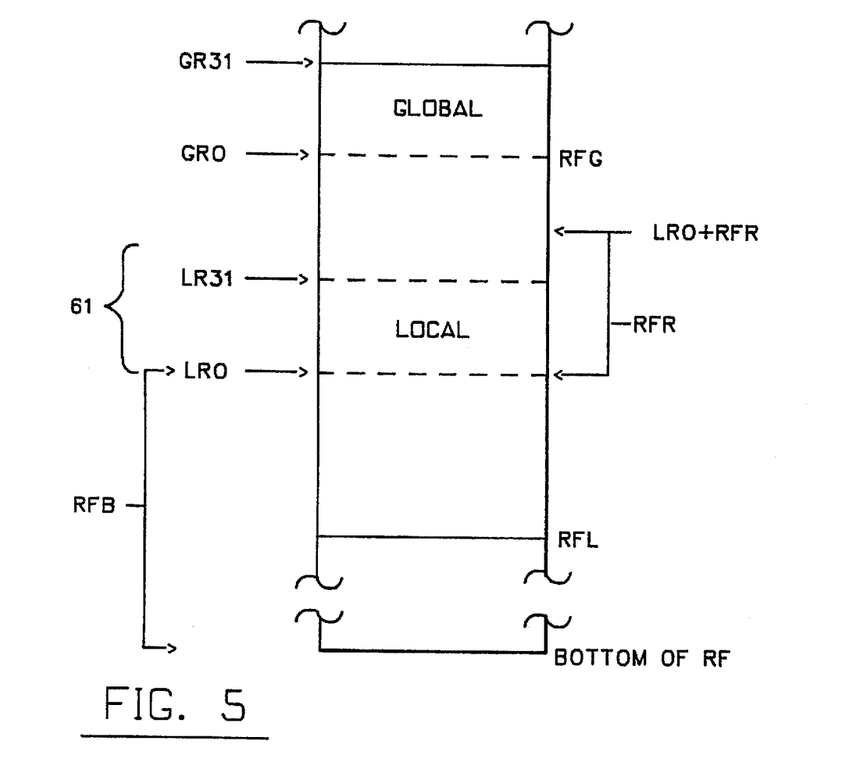
FIG. 5 illustrates the addressing of a single task section of a register file arranged in accordance with the invention.

FIG. 5 illustrates an exemplary set of registers designated for a particular task within the multiple task register file shown in FIG. 4. This set of registers includes those registers between a base address RFL and a maximum address RFG+31.

In the preferred embodiment illustrated, there are 32 global registers designated for the task. Each global register has a capacity of 32 bits. The global base register has an absolute address of RFG, and the global registers include those registers between the global base address RFG and a maximum address of RFG+31. The 32 global registers then may have addresses relative to the global base register of GR0 through GR31. Relative address GR0 corresponds to absolute register address RFG. Thus, the absolute address of each global register may be obtained by performing a calculation using the global base address and a relative address read from an instruction field. For example, the relative address "i" read from the instruction field may be added to the global base address RFG to obtain the absolute address "a" of the register to be addressed:

a=i+RFG.

The absolute address for the base register of the global registers (RFG) may be an eleven bit register address. However, the least significant three bits are preferably always 0, so that the global base register advances in blocks of eight registers, and the address can be stored in eight bits.

Figure 6:
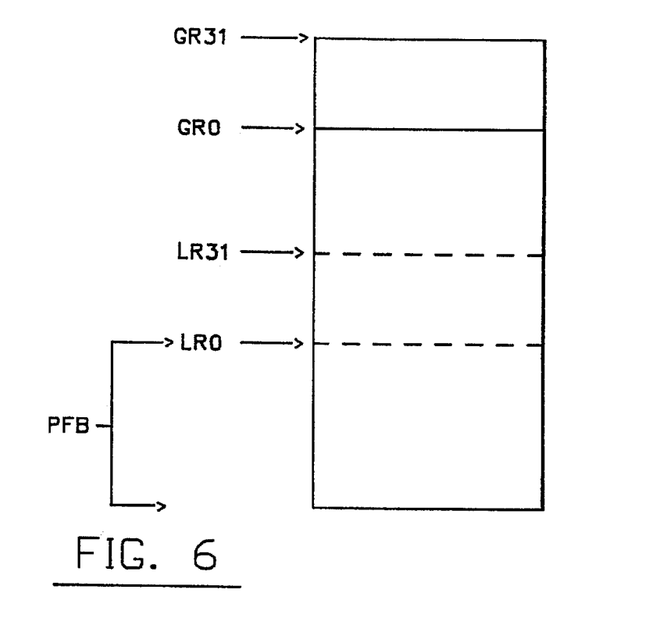
FIG. 6 illustrates an embodiment of a register file arranged for a single task environment.

In a single task environment having only a single set of global registers, the 32 global registers may be fixed, such as illustrated in FIG. 6. The global register with address "0" (GR0) may be hard wired with a 0 in every bit position, so that it always read as "0" and cannot be modified. The global register with address "1" (GR1) may be reserved as the memory stack pointer. Certain instructions may access it implicitly. The global registers (GR0-GR31) may be addressed directly by fields in the instructions.

Each set of registers assigned to a task also includes local registers. The local registers are used for temporary storage of the program counter return address, status register, system stack pointer, passed parameters, and intermediate operands.

Each set of local registers has a local base register having a local base address. FIG. 5 illustrates the local registers as those having addresses between local base address RFL and maximum address RFG-1. Virtually any number of registers may be included in each set of local registers. For example, 64 registers may be included, each having a 32 bit capacity. In the multi-task environment, because of the relative address mechanism of the invention, the various local register sets need not be of the same size, nor remain constant, as the relative position and size may be changed simply by changing the absolute base address for the set (RFL), or by changing the absolute base address for the global register set that determines the upper boundary of the register set (RFG).

Within the local register set for the task, one or more subsets or windows 61 of local registers may be designated for particular contexts within the task. Such a subset may consist of those registers having absolute addresses beginning with a subset base address RFB. The subset base address RFB in the multi-task environment may be an eleven-bit (11-bit) address whose least significant bit is zero. This allows the address to be stored in ten bits, and ensures the register subset advances in pairs of registers. In the single task environment shown in FIG. 6, a six-bit (6-bit) address for RFB may be sufficient. The least significant bit may still be zero.

The subset base address RFB provides an offset of the register window from the bottom of the register file. This subset base address must be within the range assigned to the task as local registers. For example, the illustration shows 32 registers having absolute addresses between absolute address RFB and RFB+31 as a designated subset. Thus, each register within the 32 register subset may be addressed by reading from the instruction field the local relative address (LR0-LR31) and performing a calculation involving that relative address and the subset base address RFB to obtain the absolute address of the register. This subset becomes a "window" of registers that may be addressed relative to the base register RFB. This window of registers may be relocated up or down the register file during calls, exceptions, traps, and returns, to form a system stack. This relocation or movement of the register window can be accomplished by simply changing the subset base address RFB.

In a preferred form, the calculation comprises adding the relative address (for example, "i") to the subset base address RFB. Relative address 0(local register LR0) then accesses the register having absolute address RFB. If this sum i+RFB is less than RFG (the absolute address for the base register of the global registers), the local register having an absolute address ("a") equal to that sum is addressed. Thus:

$$a=i+RFB.$$

If, however, the sum is greater than or equal to RFG, the resulting absolute address would identify a register already designated as a global register. Therefore, logic is built into the addressing mechanism so that the subset or window "wraps around" from the top of the local register set to the bottom of that local register set. If the sum i+RFB is greater than or equal to RFG, then the absolute address equals the sum minus the absolute address of the base register of the global registers<RFG), plus the base register for the set of local registers (RFL). Thus:

$$a=i+RFB-RFG+RFL.$$

This mechanism permits the subsets of local registers to "wrap around" from the top of the set of local registers to the bottom, to avoid intruding into the global registers, and to use the registers of the register file to maximum efficiency. The window of registers may thus be set anywhere within the local set of registers by simply designating the appropriate subset base address RFB.

More than one window (or subset) of registers may be designated at a time for separate contexts within a task. Each subset has its own unique subset base address RFB. These may be set independently because of the flexibility afforded by addressing each register relative to a base address. In some circumstances, it may even be desirable to have subsets overlap. Such overlap permits the overlapping registers to be accessed in separate contexts, so that certain operands may easily be shared.

Figure 7:
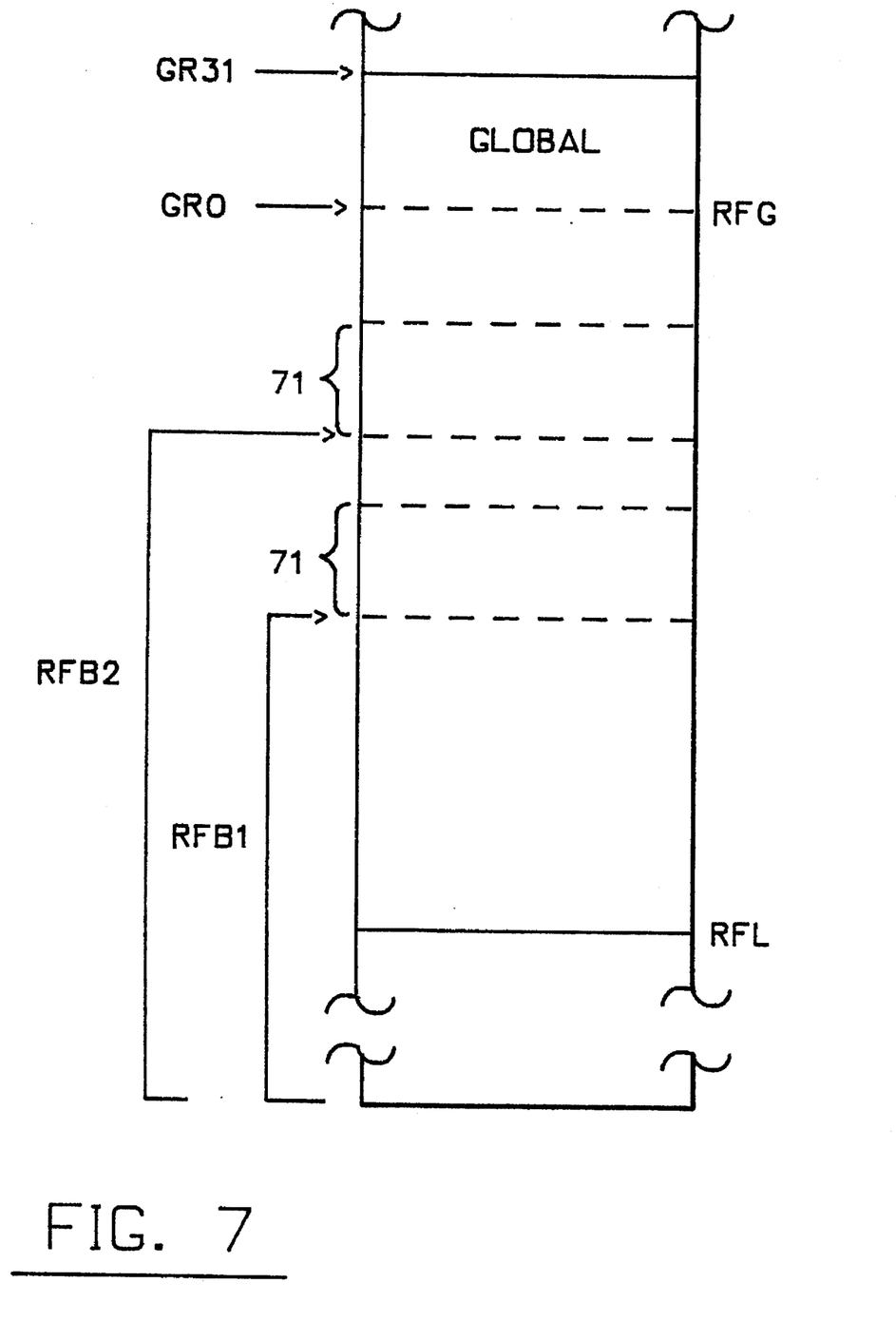
FIG. 7 illustrates the addressing of multiple windows of a single task section of a register file arranged in accordance with the invention.

An exemplary arrangement of a task environment having two subsets of local registers designated is shown in FIG. 7. A first subset 71, such as might be assigned to or designated for a first context, is shown comprising those registers having addresses beginning with a first subset base address RFB1. A second register subset 72, such as might be designated for a second context within the task is shown as comprising those registers having addresses beginning with a second subset base address RFB2. Additional subsets or windows may be designated within the task as required. Furthermore, multiple subsets may also be set up in the other task environments of the register file set up for multiple tasks.

One way to organize the windows in a single task environment is to form a stacking arrangement of overlapping windows.

A system stack may be implemented using the local registers of register file 23 and a data memory stack in the data memory 27. The local register file window (subset of registers) 61 (FIG. 5) may be the current top of stack area. The other local registers, which contain previous data, comprise the next portion of the stack, and the oldest contents reside in the data memory stack. Calls, traps, and exceptions may advance the window (register subset) 61 and store return information in the new LR0 (and LR1). Returns restore the window to its previous location using the return information.

The system stack operation may be accomplished by including in LR0 the displacement to RFB and the program counter return address. In addition, the status register address may be stored in LR1, and the registers for parameter passing and intermediate operands are the local subset registers having relative addresses LR2 and up. The pointer for this system stack is the subset base register address RFB, which can be modified by displacements associated with calls, exceptions, traps, and returns.

Each register window or subset can be moved within the local register set for that task by simply changing the subset base address RFB for that subset. The instruction execution remains unaffected because it operates on the basis of relative addresses within the window, which remain constant. To move a register window, a new subset of registers having absolute addresses beginning with a new subset base address RFB may be designated. Then, to address a register in the moved window, the relative address read from the address field of the instruction is added to the new subset base address to obtain the absolute address of the register to be accessed.

Furthermore, an entire register set for a particular task environment may be moved by designating a new base address RFL for that task. Because the calculation of the absolute addresses of registers of the global set of registers depends on a calculation directly from the global base address RFG, the new RFG should also be specified.

Both of these movability features permit the register file to be configured for maximum efficiency In the use of the registers. For example, a register window that must be enlarged could be moved to a section of the register file that has more available registers. Or, one register window may be moved to accommodate the enlargement of an adjacent window. Similar movement of entire register sets assigned to separate tasks further increases the ability to efficiently use the registers of the register file.

In the multi-task arrangement illustrated in FIGS. 4, 5 and 7, the local register base address RFL may be an eleven-bit (11-bit) address. The least significant three bits are preferably always zero (0), so that the local register base always advances in blocks of eight registers and the address can be stored in eight bits. Each register window subset base address RFB is also an 11-bit address.

Preferably the least significant bit of the address RFB is always zero (0), so that the register window base advances in pairs of registers, and the address can be stored in ten bits.

In a single task embodiment illustrated in FIG. 6 having 64 local registers, the absolute address for the base register of the subset of local registers (RFB), is preferably expressed as a six bit address. The least significant bit of the address is preferably always 0, so that the local register 0 (LR0) is always at an even absolute address.

A register file reserve may be used to reserve local registers for use by the current program, to keep them from being overwritten by an exception or trap. This register file reserve may be designated RFR, and may reserve, for example, from 4 to 34 local registers. The register file reserve RFR may be a 5-bit address modifier whose least significant bit is always 0. Thus, RFR reserves an even number of registers, and can be stored in 4 bits. Specifically, RFR reserves registers LR0 through LR(RFR+3), where RFR=0, 2, 4, ... 30. When the reserve value RFR is added to the subset base address RFB, the resulting address is always even, if RFR and RFB both contain a fixed zero in the least significant bit position.

Referring to FIG. 5, the location of reserved registers 62 is indicated. In the illustrated embodiment, the value of RFR is greater than the number of registers in the subset of registers assigned to the current program.

A reserve instruction enters a new value for RFR, and automatically saves previous data, if any, from the local registers being reserved to the memory stack in the data memory 27. The reserve instruction may also set exception enables and may relocate the memory stack pointer by adding an unsigned eight-bit field to the memory stack pointer in the global register having relative address GR1. After a call, exception, or trap, the first instruction in the subprogram should be a reserve instruction.

A call instruction may contain a displacement field (RFD), which is used to modify the subset base register address RFB to relocate the register file window or subset. The new subset base register address may be calculated by adding to the old base register absolute address the displacement RFD+2. Thus:

New $RFB$=Old $RFB+RFD+2$

The two is added to the displacement to automatically protect the return information in the local registers LR0 and LR1.

The displacement value RFD may be, like the register file reserve value RFR, a 5-bit address modifier whose least significant bit is always 0, so that it can be stored in 4 bits. Alternatively, in environments in which smaller register file sets are to be used, and thus smaller displacement values are to be expected, the displacement field RFD may be a 4-bit value that can be added to the four least significant alterable bits of the base register absolute address RFB.

If the displacement value RFD is greater than the file register reserve value RFR, some registers may be in danger of being overwritten. Thus, caution will need to be exercised in accessing such registers. The displacement value RFD, the register file reserve value RFR, and the return address for the program counter are stored in the register file location addressed by new base register having local relative address LR0.

When the ALU encounters an exception, or a trap instruction is executed, the register file reserve modifier RFR is used to modify the subset base register address RFB to relocate the register file window. The reserve value RFR is added to the local subset window base address RFB in setting the new subset base address, to move the local window past the registers being protected. The new base register absolute address is calculated from the old base register address by adding the value of the reserve displacement RFR plus two.

Thus:

New $RFB$=Old $RFB+RFR+2$

The old RFR value and the return address for the program counter are stored in the new LR0. The status register is stored in the new LR1. A return instruction executed by the ALU restores the local subset window register address RFB to its previous value by subtracting the displacement RFD+2 from it (if a call return), or the register file reserve value RFR+2, if the return is from an exception or trap. In either of these cases, the reserve value, program counter, and status register (if an exception or trap return) are restored.

The additional "2" added to the displacements RFR and RFD automatically protects return information that is stored in the registers having relative addresses LR0 and LR1.

An autosave mode may provide for loading the contents of local registers into the data memory stack, to free up those registers protected by the reserve instruction. An autorestore mode permits the restoring of saved register contents back to the local registers from the data memory stack during a return instruction. Local registers should only be saved or restored when they are in danger of being overwritten, and then only if the autosave mode bit in the status register is enabled.

A register file save register having address RFS may be used as a pointer dividing the local registers with the oldest data from those with the newer data. This register may contain the register file absolute address of the next local register to be saved, or the one above the next local register to be restored. Thus, the contents of register RFS divides the registers that have already been saved, and thus may be overwritten, from those that should not be overwritten. When the ALU is operating in a context that accesses a subset of registers having absolute addresses beginning with RFB, the register file logic ensures that the registers to be accessed do not contain data that should not be overwritten. This criterion is met if the subset of registers to be accessed, plus registers reserved by RFR, are all below the register identified by the contents of register RFS.

If the register file save register address RFS is greater than the register subset window absolute address RFB, then the local registers are considered "safe" from being overwritten if the register file save register address RFS is greater than the window base address RFB plus the reserve value RFR plus 3. Thus, the accessed registers are safe if:

$$RFS > RFB + RFR + 3.$$

If, however, RFS is less than or equal to RFB, then the local registers being accessed are safe if:

$$RFS + RFG - RFL > RFB + RFR + 3.$$

The latter computation accounts for the local register window "wrapping around" to the bottom of the registers assigned to the task.

A data memory stack address may be stored in a register having absolute address RFM. This data memory stack address points to the data at the top of the memory stack in the data memory. The contents of the register RFM may be a 32-bit address.

During a reserve instruction, local registers may be automatically saved to the data memory stack until the safe criteria is satisfied. During a return, a delay slot instruction is executed first, then the window base address RFB is restored next, then the local registers are automatically restored from the data memory stack until the safe criteria is met.

When the autosave and autorestore modes are used, local register file address calculations are performed in a "modulo" fashion so that the register address remains less than RFG and no less than RFL. This means that if an address calculation gives a result greater than or equal to RFG, then the quantity (RFG - RFL) is subtracted from the calculation to cause the address to "wrap" to the bottom of the local register set. If an address calculation gives a result less than RFL, then the quantity (RFG - RFL) is added to the calculation to cause the address to "wrap" to the top of the local register set.

One of the slgnlficant benefits of a register file constructed and managed in accordance with the invention is that the ALU may switch between contexts, or even between tasks, virtually instantaneously. Task switching may be accomplished by transferring to a task switching routine.

A trap instruction should be used if a future return to the old task is desired. A trap pushes return information onto the system stack of the new task.

The task switching routine saves the values RFM, RFG, RFL, RFS, and RFB if a return to the old task is desired, and then loads these registers with information about the new task. The data memory stack pointer in register RFM is stored and restored as a separate 32 bit word. The local and global base addresses RFL and RFG may be jointly stored and restored using one word. This is possible because each is eleven bits in length. Thus, each fits in one half of the 32-bit word. The save address RFS and the base for the local register subset window RFB may be jointly stored using another word. These addresses are also eleven bits, so they each fit in one half of the 32-bit word.

If automatic saving and restoring of the local registers to memory is not necessary, all that need be done to switch tasks is to reload the local base address RFL for the set of registers associated with the task, and the global base address RFG. The register file base register address RFB for a particular context may also be modified for the particular context within the task being addressed.

Figure 8:
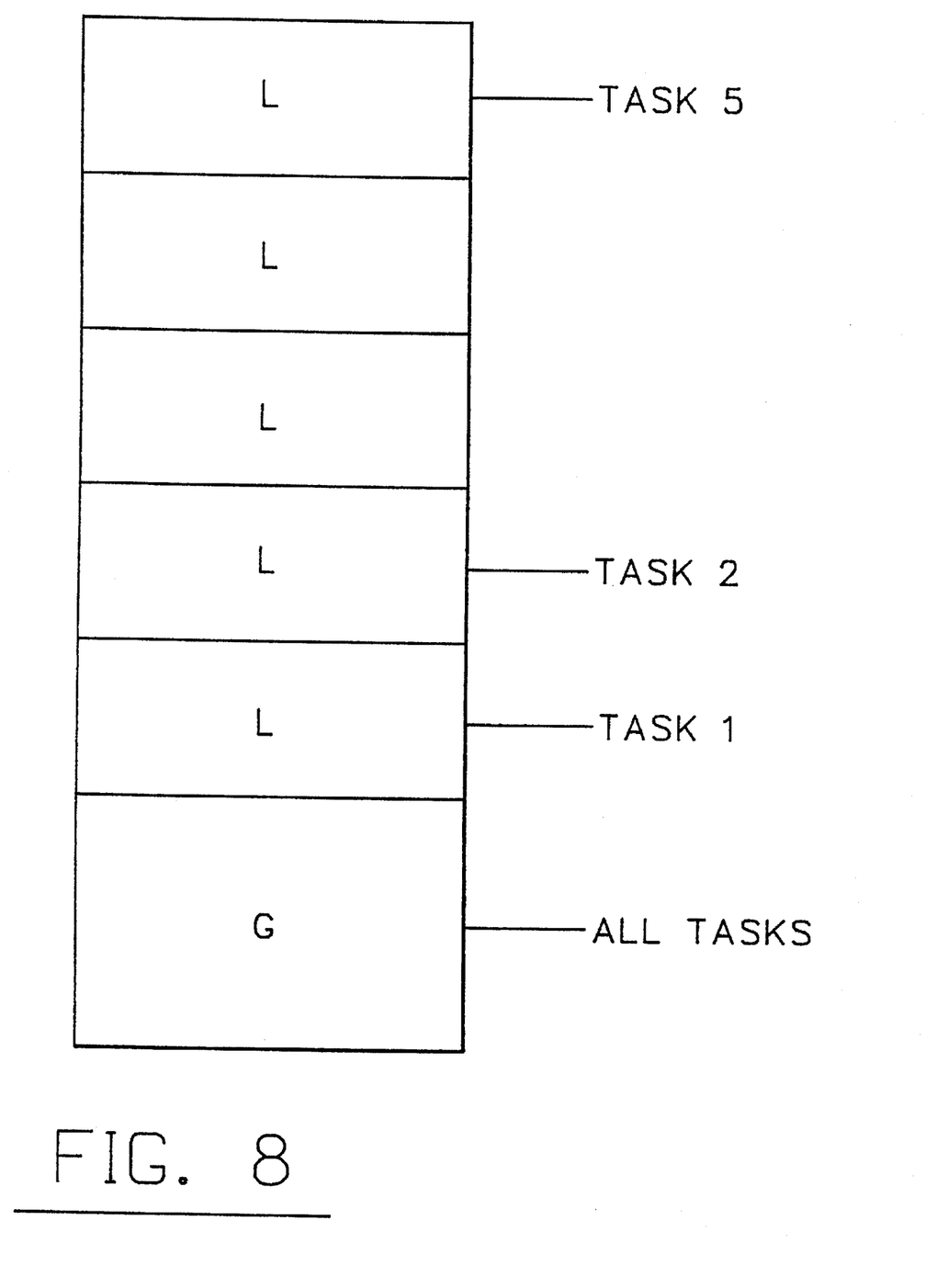
FIG. 8 illustrates another scheme for register file addressing in accordance with the invention.

Those skilled in the art may find another scheme of register file addressing, which is illustrated in FIG. 8, particularly useful. The lower 32 addresses may be used for global registers ("G") and the upper addresses for local registers ("L"). The register file should have contiguous addressing and no gaps will appear between the global register allocation and the local registers. With that in mind, the global registers can now be accessed as local registers simply by positioning a base register within the global address range. In this way, a portion of the lower 32 registers can be allocated as local registers instead of global registers. The re-assignment should be positioned to replace the higher global registers.

Figure 9:
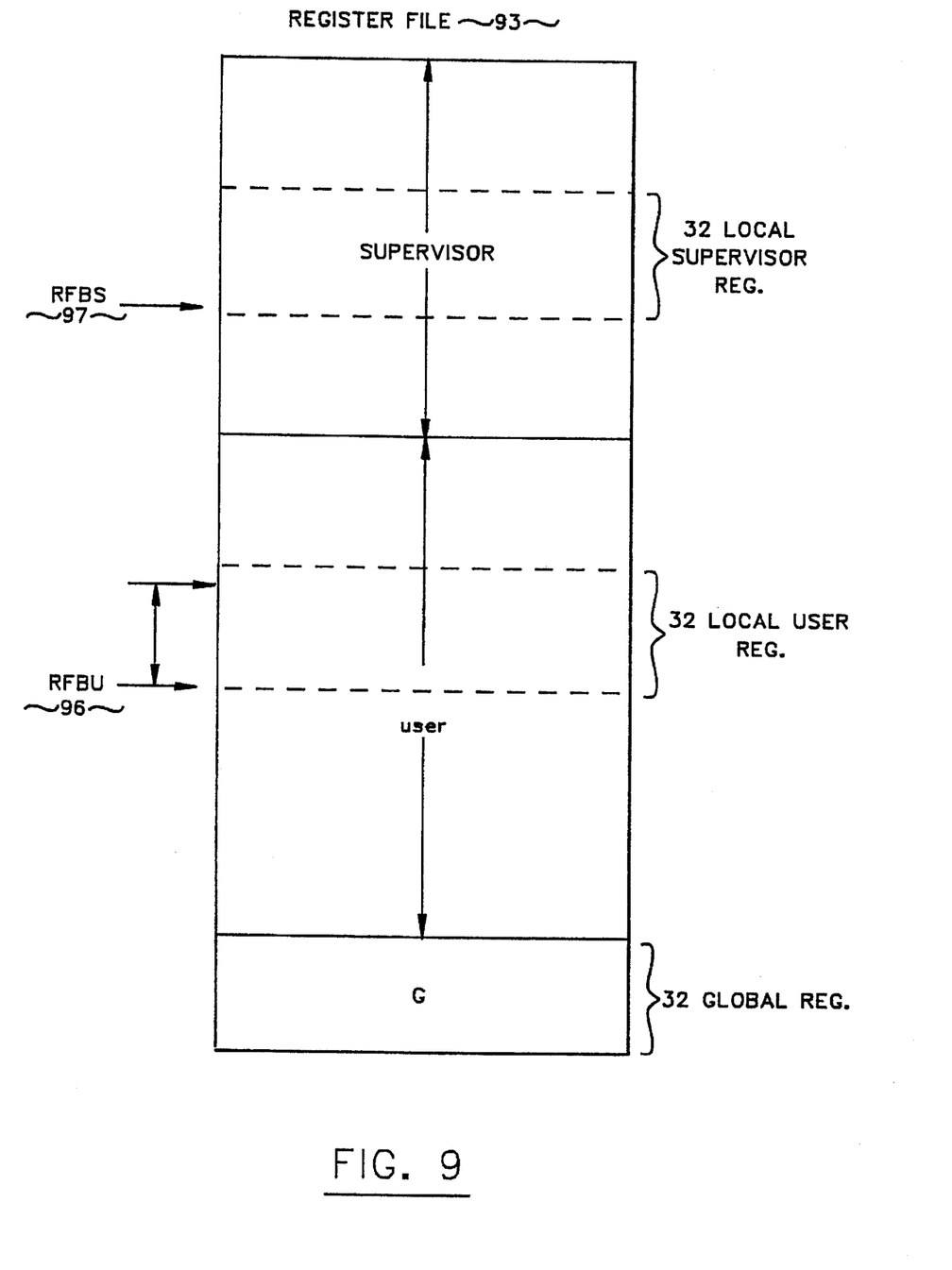
FIGS. 9 and 10 illustrate the addressing of user and supervisor local registers of a register file in accordance with the invention.
Figure 10:
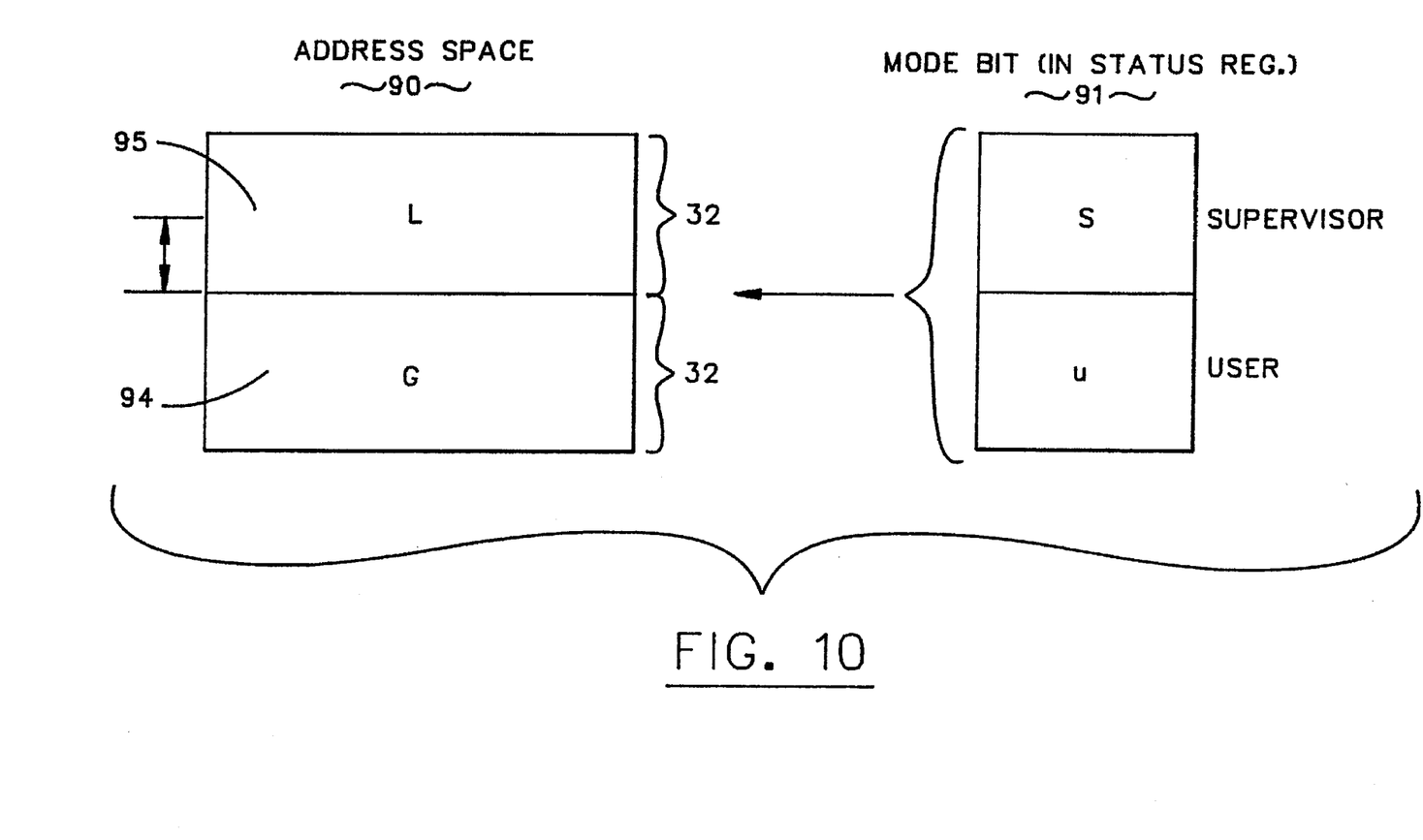

FIGS. 9 and 10 illustrate a further register file addressing particularly suited for user and supervisor local addressing. If the address space 90 indicates global registers 94, then the lower 32 global registers 94 may be addressed. However, if the address space 90 indicates local registers 95, then a mode bit 91 (in a status register) will be used to determine whether it is intended for a user local or a supervisor local register. Then, the local register, whether it is supervisor or user, can be accessed based on the relative address within the local portion of the address space 90. Note that both the user and supervisor registers have their respective RFBU 96 (Register File Base User) and RFBS 97 (Register File Base Supervisor) for accessing the target register based on the relative address.

Although particular embodiments of the invention have been described above and its use in a particular environment has been illustrated, those skilled in the art will recognize that numerous modifications may be made, and that many other environments may employ the invention.

I claim:

1. A method of managing a register file in which each register has a unique absolute address, the method comprising:

designating a first set of registers, said first set comprising registers having absolute addresses commencing with a first base address;

designating a second set of registers, said second set comprising registers having absolute addresses commencing with a second base address; and addressing a register of said register file, said addressing step comprising:

reading a relative address from an address field in an instruction;

determining whether said relative address identifies a register of said first register set or a register of said second register set;

if said relative address identifies a register of said first set, calculating from said relative address and said first base address the absolute address for the register to be addressed; and if said relative address identifies a register of said second set, calculating from said relative address and said second base address the absolute address for the register to be addressed, designating a third set of registers said third set of registers comprising registers having absolute addresses commencing with a third base address;

disassociating said first set of registers and said first task; and associating said third set of registers and said first task; wherein:

said first set of registers is associated with a first task and said second set of registers is associated with a second task;

said step of determining whether said relative address identifies a register of said first set comprises determining whether said instruction is in said first task; and said step of determining whether said relative address identifies a register of said second set comprises determining whether said instruction is in said second task.

2. The method of claim 1, wherein said step of determining whether said relative address identifies a register of said third set comprises determining whether said instruction is in said first task.

3. A method of managing a register file comprising a plurality of registers, each register having a unique absolute address, the method comprising:

assigning to a first task a first set of registers commencing with a first base address, wherein said first register set includes a first set of global registers commencing with a first global base address, and a first set of local registers commencing with a first local base address;

assigning to a first context within said first task a first subset of said first set of local registers, said first subset commencing with a first context base address;

assigning to a second context within said first task a second subset of said first set of local registers, said second subset commencing with a second context base address;

assigning to a second task a second set of registers commencing with a second base address, wherein said second set of registers includes a second set of global registers commencing with a second global base address, and a second set of local registers commencing with a second local base address;

addressing one of said global registers of said first set of registers by reading from an address field of a first instruction pertaining to said first task a first relative address, determining that said first relative address identifies a global register assigned to said first task, and calculating from said first global base address and said first relative address the absolute address for said global register;

addressing a first local register, said first local register being in said first subset of registers, by reading from an address field of an address field of a second instruction a second relative address, determining that said second instruction pertains to said first context within said first task, and calculating from said first context base address and said second relative address the absolute address for said first local register; and addressing a second local register, said second local register being in said second subset of registers, by reading from an address field of a third instruction a third relative address, determining that said third instruction pertains to said second context of said first task, and calculating from said second context base address and said third relative address the absolute address for said second local register.

4. The method of claim 3, additionally comprising:

subsequently assigning to said first context of said first task a third subset of said first set of registers commencing with a third context base address; and addressing a third local register, said third local register being in said third subset of said first set of registers, by reading from an address field of a fourth instruction a fourth relative address, determining that said fourth instruction pertains to said first context of said first task, and calculating from said fourth relative address and said third context base address the absolute address for said third local register.

5. The method of claim 3, additionally comprising:

reassigning to said first task a third set of registers commencing with a third set of registers commencing with a third base address, wherein said third set of registers includes a third set of global registers commencing with a third global base address, and a third set of local registers commencing with a third local base address;

reassigning to said first context within said first task a third subset of registers, within said third set of registers, said third subset commencing with a third context base address;

reassigning to said second context within said first task a fourth subset of registers, within said third set of registers, said fourth subset commencing with a fourth subset commencing with a fourth context base address;

addressing a second one of said global registers of said third set of registers by reading from an address field of a fifth instruction pertaining to said first task a fourth relative address, determining that said fifth instruction address field identifies a global register assigned to said first task, and calculating from said third global base address and said fourth relative address the absolute address for said second global register;

addressing a third local register, said third local register being in said third register subset, by reading from an address field of a sixth instruction a fifth relative address, determining that said sixth instruction pertains to said first context of said first task, and calculating from said third context base address and said fifth relative address the absolute address for said third local register;

addressing a fourth local register, said fourth local register being in said fourth subset of registers, by reading from an address field of a seventh instruction pertaining to said second context of said first task a sixth relative address, determining that said being in said fourth subset of registers, by reading from an address field of a seventh instruction pertains to said second context of said first task, and calculating from said fourth context base address and said sixth relative address the absolute address for said fourth local register.

6. The method of claim 3, additionally comprising:

assigning to a first context within said second task a third subset of registers, within said second set of local registers, said third subset commencing with a third context base address;

addressing one of said registers of said second set of global registers, said addressing comprising:
  reading from an eighth instruction address field a fourth relative address;
  determining that said eighth instruction address field identifies a global register assigned to said second task; and
  calculating from said second global base address and said fourth relative address the absolute address for said global register of said second set; and
addressing one of said local registers of said second set of local registers, said addressing comprising:
  reading from a ninth instruction address field a fourth relative address;
  determining that said ninth instruction pertains to said first context of said second task; and
  calculating from said third context base address and said fifth relative address the absolute address for said local register of said second set.

7. In a computer having a memory and an arithmetic logic unit (ALU) for performing arithmetic operations on operands in accordance with program instructions, a register file comprising:

a plurality of registers coupled to said memory and to said ALU for temporarily storing operands for use by said ALU, wherein each of said registers of said register file has a unique absolute address;

means for designating a first set of said registers, said first set comprising registers having absolute addresses commencing with a first base address, wherein said first set of registers includes a first set of global registers commencing with a first global base address, and a first set of local registers commencing with a first local base address;

means for designating a second set of said registers, said second set comprising registers having absolute addresses commencing with a second base address, wherein said second set of registers includes a second set of global registers commencing with a second global base address, and a second set of local registers commencing with a second local base address; and means for addressing a register of said register file, said addressing means comprising:

means for reading from an instruction a relative address;

means for determining whether said relative address identifies a register of one of said first set of global registers, said first set of local registers, said second set of global registers and said second set of local registers;

means for calculating the absolute address of the register to be addressed from said relative address and said first global base address, if said relative address identifies a register of said first set of global registers; or said first local base address, if said relative address identifies a register of said first set of local registers; or said second global base address, if said relative address identifies a register of said second set of global registers; or said second local base address if said relative address identifies a register of said second set of local registers;

wherein, said means for determining whether said relative address references a register of said first set of registers, or a register of said second set of registers comprises means for determining whether said ALU is operating in a first task, or in a second task;

wherein, said designating means additionally includes means for designating within said first set of local registers a first local subset beginning with a first local subset base address, and a second local subset or registers beginning with a second local subset base address; and said means for determining whether said ALU is operating in said first task or in said second task additionally determines, if said ALU is operating in said first task, whether said ALU is operating within a first context or a second context.

* * * * *